CARRIER TRANSMISSION SYSTEM FOR REDUCING IMPULSE NOISE

Filed Nov. 23, 1959 2 Sheets-Sheet 1

INVENTORS.
WILLIAM L. BRUNE
ARTHUR F. PERKINS
J. CARTER PERKINS, JR.

BY Robert L. Nathans

ATTORNEY

United States Patent Office 3,105,937

Patented Oct. 1, 1963

3,105,937

CARRIER TRANSMISSION SYSTEM FOR REDUCING IMPULSE NOISE

William L. Brune, Winston-Salem, N.C., and Arthur F. Perkins, Pittsford, and J. Carter Perkins, Jr., Victor, N.Y., assignors to General Dynamics Corporation, Rochester, N.Y., a corporation of Delaware Filed Nov. 23, 1959, Ser. No. 854,762

4 Claims. (Cl. 325—50)

The present invention relates to carrier wave transmission systems and more particularly to carrier systems utilizing single sideband transmission.

In the communication field, it is desirable to transmit and reproduce information over a carrier link without interference by random impulse noise. The conventional single sideband transmission system requires means at the receiver for generating a demodulating carrier wave having the same frequency as the original modulating carrier wave and being in phase with the original modulating carrier. If the demodulating carrier wave becomes out-of-phase with the original modulating carrier, the components of the output signal will undergo a phase shift equal to the difference in phase of the modulating and demodulating carriers. In high speed data transmission, this is extremely undesirable.

Accordingly, it is a principal object of the present invention to provide an improved carrier wave transmission system.

It is a further object of the present invention to provide an improved single sideband carrier wave transmission system capable of greatly reducing the effect of impulse noise and random phase shifts of the carrier wave on the information reproduced by the demodulating circuitry.

It is a further object of the present invention to provide a single sideband carrier transmission system which eliminates the need to phase lock the carrier wave source generated at the transmitter with the demodulating carrier wave source at the receiver.

Further objects, features and advantages of the present invention will become apparent as the following description proceeds and the features of novelty which characterize the invention will be pointed out with particularity in the claims annexed to and forming a part of this specification.

Figure 1:
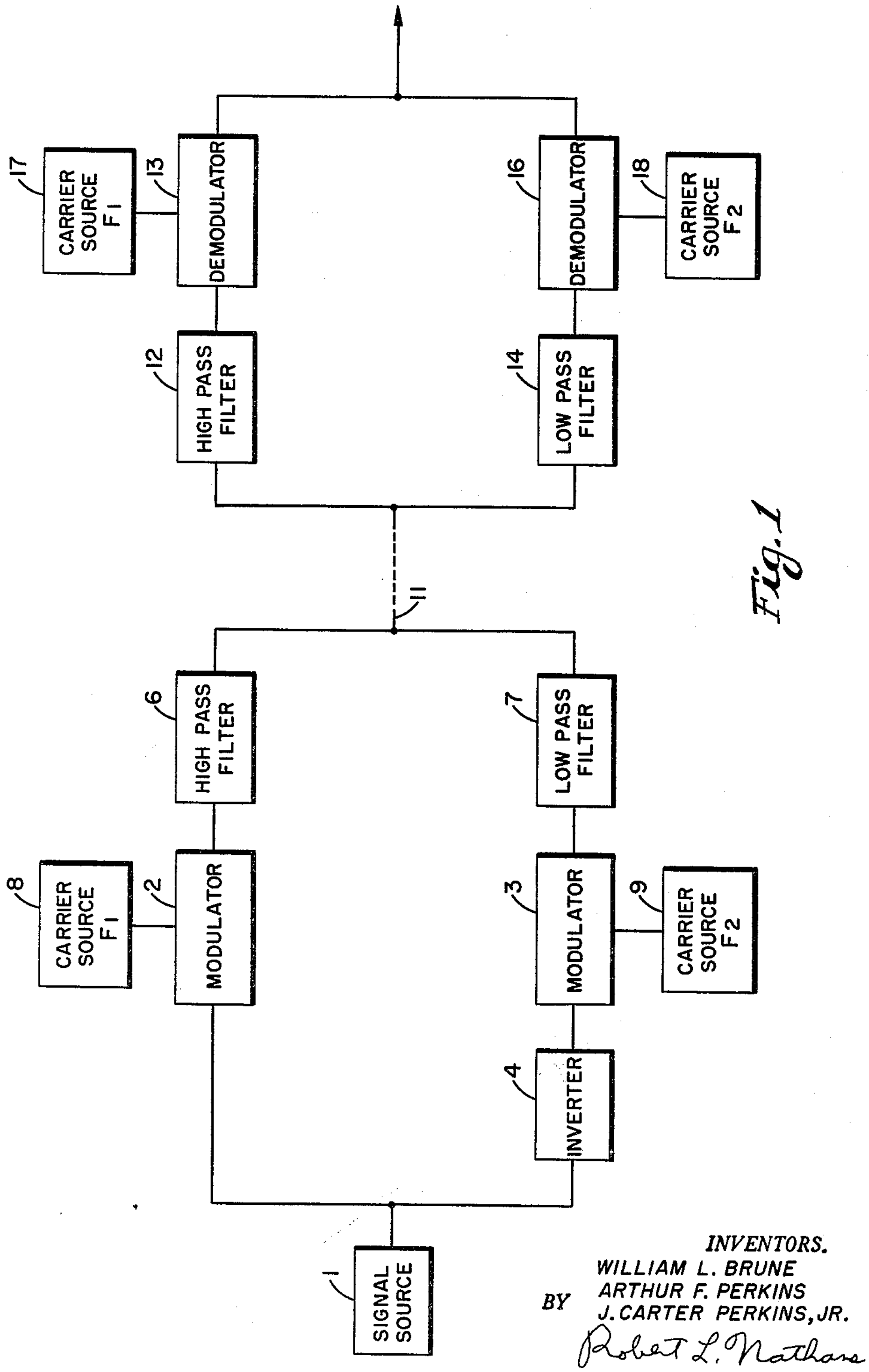
Figure 2:
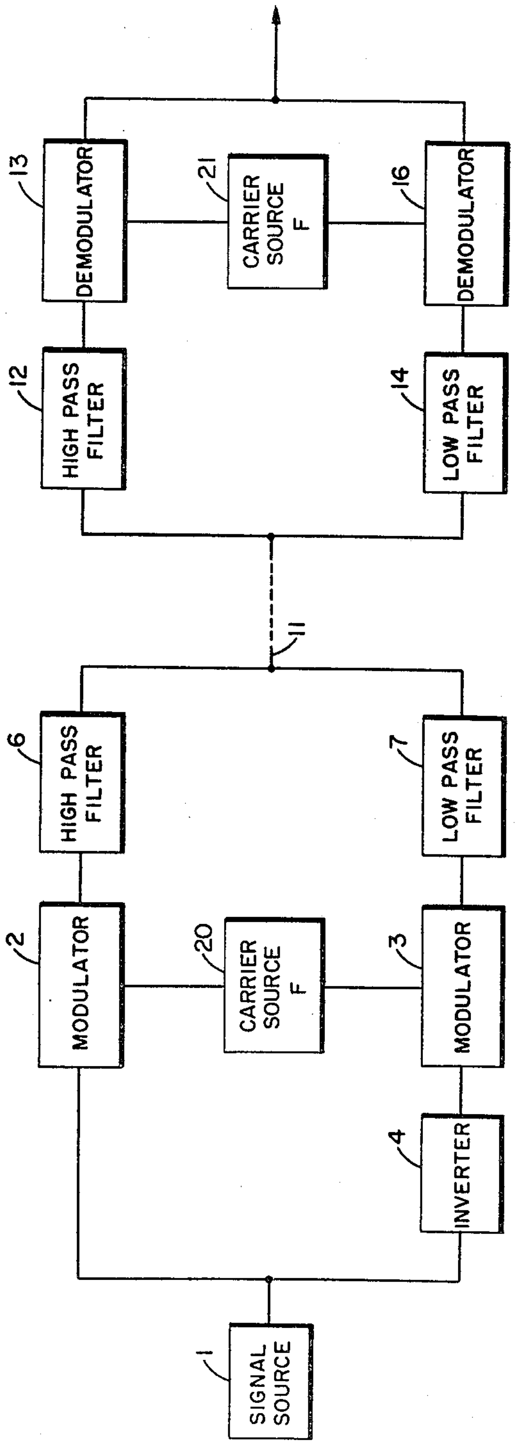

For a better understanding of the present invention, reference may be had to the accompanying drawing which discloses FIG. 1 showing a schematic diagram of one embodiment of the present invention and FIG. 2 showing a schematic diagram showing another embodiment of the present invention.

Referring now to both FIGS. 1 and 2 of the drawing, a signal source 1 is shown connected to the input circuit of modulator 2 and coupled to the input circuit of modulator 3 through inverter 4. Signal source 1 could be a generator for producing binary bits or an audio frequency source or, for that matter, any other relatively low frequency voltage source. Modulators 2 and 3 produce amplitude-modulated signals which are introduced into the input circuits of highpass filter 6 and lowpass filter 7, respectively. Modulators 2 and 3 modulate the carriers produced by carrier sources 8 and 9, respectively, in the embodiment shown in FIG. 1, or single carrier source 20 in the embodiment shown in FIG. 2, in accordance with the signal produced by source 1. Thus, the embodiments of the present invention disclosed in FIGS. 1 and 2 differ from each other in that the embodiment shown in FIG. 1 utilizes two separate carrier sources 8 and 9, while the embodiment shown in FIG. 2 utilizes only the single carrier source 20. Highpass filter 6 passes the upper sideband produced by modulator 2 but blocks the transmission of the lower sideband produced by modulator 2. On the other hand, lowpass filter 7 allows the lower sideband produced by modulator 3 to be passed but prevents the upper sideband produced by modulator 3 from being impressed upon transmission link 11. At the receiving station, highpass filter 12 permits only the upper sideband produced by modulator 2 and impressed upon transmission link 11 to be introduced into the input circuit of demodulator 13 which may be of any standard type. Lowpass filter 14 introduces only the lower sideband produced by modulator 3 and impressed upon transmission link 11, into the input circuit of demodulator 16. In FIG. 1, a demodulating carrier wave is introduced into demodulator 13 by source 17 thereby to recover the signal applied to the input circuit of modulator 2 in the conventional manner. The frequency of source 17 must be equal to the frequency of source 8 in order for proper demodulation of the upper sideband to take place. Similarly, in FIG. 1 a demodulating carrier wave 18, having the same frequency as the wave produced by carrier source 9, is introduced into demodulator 16 by source 18 thereby to cause the signal introduced by signal source 1 into the input circuit of inverter 4 to be reproduced at the output circuit of demodulator 16. A phase shift of 180 degrees of the signals produced at the input circuit of demodulator 13 takes place because the frequency of the carrier wave produced by source 17 is lower than the frequency of the sideband introduced into the input circuit of demodulator 13 by highpass filter 12. It should be noted that a phase shift of 180 degrees of the signals introduced into the input circuit of demodulator 16 is not produced by the demodulation process within demodulator 16 because the frequency of the wave produced by carrier source 18 is greater than the frequency of the signal introduced into the input circuit of demodulator 16 by lowpass filter 14. In FIG. 2, single carrier source 21, which operates at the same frequency as carrier source 20, performs the functions of both carrier sources 17 and 18 of FIG. 1.

The crux of the present invention lies in the inversion of a modulating signal applied to a first of two single sideband transmitters whose output circuits are coupled to a common transmission channel, the reinversion of only the previously inverted sideband at the receiver and the recombining of the output signals of the demodulators, thereby to reproduce the orignal signal generated by source 1.

The present invention provides for the substantial elimination of the undesirable effects of impulse noise and small carrier phase shifts on the output signal of the system. Impulse noise is noise that is randomly distributed in frequency but phase related between frequency components. Accordingly, impulse noise affecting one of the transmitted sidebands will affect the other transmitted sideband in the opposite direction due to the 180 degrees phase reversal caused by inverter 4 at the transmitting station. Adding the two recovered signals together at the output circuit of the system produces an output signal unaffected by impulse noise. In addition, small phase shifts between the waves produced by the carrier sources at the transmitting and receiving stations will be eliminated in the demodulation process.

As previously stated, a single carrier source producing a single frequency output wave could be utilized at the transmitting station and the upper sideband produced thereby could be passed by one filter and the lower sideband could be passed by the other filter. Similarly, only the upper sideband would be introduced into one demodulator and only the lower sideband would be introduced into the other demodulator at the receiving station. A single source of a demodulating carrier wave would be utilized at the receiving station having the same frequency as the carrier wave source at the transmitting station. Although this arrangement is simpler than the preferred embodiment disclosed in FIG. 1 of the drawing, it would be difficult to design the highpass and lowpass filters having the requisite sharpness of frequency cutoff. By providing two carrier waves having different frequencies, such as 950 kilocycles and 2700 kilocycles at the transmitting station and by passing the upper sideband of the 950 kilocycle carrier wave and the lower sideband of the 2700 kilocycle carrier wave and rejecting the other two sidebands, the problem is eliminated. However, the two sidebands transmitted over link 11 should be close enough together on the frequency spectrum so that they pass through the system with substantially the same delay time. It should be noted that inverter 4 could be inserted between modulator 2 and signal source 1 and the operation of the system would be substantially unaffected.

It should be noted that the present invention eliminates the need to phase lock the carrier wave sources at the transmitter with the demodulating carrier wave sources at the receiver. This is true because there are both first and second carrier frequency sources at the transmitter, namely, carrier source 8 and carrier source 9 in FIG. 1, and first and second demodulating carrier frequency sources at the receiver, namely, carrier frequency sources 17 and 18 in FIG. 1. The two carrier frequency sources at the receiver are phase locked with each other, but not with the carrier frequency sources at the transmitter. Therefore, if the carrier frequency sources at the receiver are only frequency synchronized, but not phase locked, to the carrier frequency sources of the transmitter, any small random phase shift which occurs between the transmitter and receiver will occur equally for the first and second demodulating carrier frequency sources at the receiver. Any effect of this phase shift on one demodulating carrier frequency source at the receiver will be compensated by an identical phase shift of the other demodulating carrier frequency source at the receiver. Thus, by utilizing two, rather than one, frequency sources at both the transmitter and receiver it is not necessary to phase lock the receiver frequency sources with the transmitter frequency sources.

While we have shown and described a specific embodiment of our invention, other modifications will readily occur to those skilled in the art. We do not therefore desire our invention to be limited to the specific arrangement shown and described and we intend in the appended claims to cover all modifications within the spirit and scope of the invention.

What is claimed is:

1. A communication system comprising a first and second modulator each having an input and output circuit, a signal source communicating with the input circuits of said first and second modulator, a first carrier wave source coupled to said first and second modulators, means for inverting the signal applied to the input circuit of one of said first and second modulators by said signal source, a transmission link, a first filter coupled between the output circuit of said first modulator and said transmission link for passing one sideband of the output signal of said first modulator, a second filter coupled between the output circuit of said second modulator and said transmission link for passing one sideband of the output signal of said second modulator, first and second demodulators each having an input and output circuit, a second carrier wave source having substantially the same frequency of said first carrier wave source, means for coupling said second carrier wave source to said first and second demodulators, a third filter coupled between the input circuit of said first demodulator and said transmission link for passing one sideband present on said transmission link, a fourth filter coupled between the input circuit of said second demodulator and said transmission link for passing the other sideband present on the transmission link, and means for recombining the demodulated signals produced in the output circuits of said first and second demodulators.

2. A communication system comprising, a first and second modulator each having an input and output circuit, a signal source communicating with the input circuits of said first and second modulator, a first carrier wave source coupled to said first and second modulators, means for inverting the signal applied to the input circuit of one of said first and second modulators by said signal source, a transmission link, a first filter coupled between the output circuit of said first modulator and said transmission link for passing the lower sideband of the output signal of said first modulator, a second filter coupled between the output circuit of said second modulator and said transmission link for passing the upper sideband of the output signal of said second modulator, first and second demodulators each having an input and output circuit, a second carrier wave source having substantially the same frequency as said first carrier wave source, means for coupling said second carrier wave source to said first and second demodulators, a third filter coupled between the input circuit of said first demodulator and said transmission link for passing the lower sideband present on said link, a fourth filter coupled between the input circuit of said second demodulator and said transmission link for passing the upper sideband present on said link, and means for recombining the demodulated signals produced in the output circuits of said first and second demodulators.

3. A communication system comprising, a first and second modulator each having an input and output circuit, a signal source communicating with the input circuits of said first and second modulator, a first carrier wave source coupled to said first modulator for producing a carrier wave having a first frequency, a second carrier wave source for producing a second frequency coupled to said second modulator, means for inverting the signal applied to the input circuit of one of said first and second modulators by said signal source, a transmission link, a first filter coupled between the output circuit of said first modulator and said transmission link for passing one sideband of the output signal of said first modulator, a second filter coupled between the output circuit of said second modulator and said transmission link for passing one sideband of the output signal of said second modulator, first and second demodulators each having an input and output circuit, a third carrier wave source for producing a carrier wave having substantially the same frequency as the first carrier wave source, means for coupling said third carrier wave source to said first demodulator, a fourth carrier wave source for producing a carrier wave having substantially the same frequency as said second carrier wave source, means for coupling said fourth carrier wave source to said second demodulator, a third filter coupled between the input circuit of said first demodulator and said transmission link for passing one sideband present on said transmission link, a fourth filter coupled between the input circuit of said second demodulator and said transmission link for passing the other sideband present on the transmission link and means for recombining the demodulated signals produced in the output circuits of said first and second demodulators.

4. A communication system comprising, a first and second modulator each having an input and output circuit, a signal source communicating with the input circuits of said first and second modulator, a first carrier wave source coupled to said first modulator for producing a carrier wave having a first frequency, a second carrier wave source coupled to said second modulator for producing a second frequency, means for inverting the signal applied to the input circuit of one of said first and second modulators by said signal source, a transmission link, a first filter coupled between the output circuit of said first modulator and said transmission link for passing the upper sideband of the output signal of said first modulator, a second filter coupled between the output circuit of said second modulator and said transmission link for passing the lower sideband of the output signal of said second modulator, first and second demodulators each having an input and output circuit, a third carrier wave source for producing a carrier wave having substantially the same frequency as the first carrier wave source, means for coupling said third carrier wave source to said first demodulator, a fourth carrier wave source for producing a carrier wave having substantially the same frequency as said second carrier wave source, means for coupling said fourth carrier wave source to said second demodulator, a third filter coupled between the input circuit of said first demodulator and said transmission link for passing the upper sideband passed by said first filter and present on said transmission link, a fourth filter coupled between the input circuit of said second demodulator and said transmission link for passing the lower sideband passed by said second filter present on said transmission link and means for recombining the demodulated signals produced in the output circuits of said first and second demodulators.

References Cited in the file of this patent

UNITED STATES PATENTS

| | | |
|---|---|---|
| 2,175,270 | Koch | Oct. 10, 1939 |
| 2,248,250 | Peterson | July 8, 1941 |
| 2,635,226 | Harris | Apr. 14, 1953 |
| 2,719,955 | Thompson | Oct. 4, 1955 |
| 2,735,983 | McLeod | Feb. 21, 1956 |
| 2,777,900 | Cowan | Jan. 15, 1957 |